(12) United States Patent
Pandey et al.

(10) Patent No.: US 10,600,112 B2
(45) Date of Patent: Mar. 24, 2020

(54) SYSTEMS AND METHODS FOR DIRECTING A USER TO A LOCATION OF INTEREST

(71) Applicant: Walmart Apollo, LLC, Bentonville, AR (US)

(72) Inventors: Subodh Kumar Pandey, Bentonville, AR (US); Jimmie R. Clark, Fayetteville, AR (US); Christopher Soames Johnson, Pea Ridge, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 197 days.

(21) Appl. No.: 15/726,700

(22) Filed: Oct. 6, 2017

(65) Prior Publication Data

US 2018/0101892 A1 Apr. 12, 2018

Related U.S. Application Data

(60) Provisional application No. 62/406,578, filed on Oct. 11, 2016.

(51) Int. Cl.
| | | |
|---|---|---|
| *G06Q 30/00* | (2012.01) | |
| *G06Q 30/06* | (2012.01) | |
| *G06F 16/29* | (2019.01) | |
| *G01C 21/20* | (2006.01) | |

(52) U.S. Cl.
CPC ....... *G06Q 30/0639* (2013.01); *G01C 21/206* (2013.01); *G06F 16/29* (2019.01)

(58) Field of Classification Search
CPC .... G05D 1/0234; G07G 1/0045; G06Q 30/06; G06Q 10/047
USPC ................................ 705/26.1, 27.1
See application file for complete search history.

(56) References Cited

U.S. PATENT DOCUMENTS

| | | |
|---|---|---|
| 6,982,649 B2 | 1/2006 | Blum et al. |
| 7,375,634 B2 | 5/2008 | Sprague |
| 2001/0029882 A1 | 10/2001 | Pharo et al. |
| 2008/0107481 A1 | 5/2008 | Donald et al. |

(Continued)

FOREIGN PATENT DOCUMENTS

WO 2014128507 A2 8/2014

OTHER PUBLICATIONS

Shekar et. al, "iGrocer—A ubiquitous and pervasive smart grocery shopping system," (2003) Proceedings of the ACM Symposium on Applied Computing, 22:652 teaches the known technique of creating a route to a product of interest.*

(Continued)

*Primary Examiner* — Brandy A Zukanovich
(74) *Attorney, Agent, or Firm* — Schmeiser, Olsen & Watts LLP; Timothy P. Collins (57) ABSTRACT

A system for directing a shopper to an item of interest in a store comprises a floor surface at a store configured with indicators that communicate with each other to identify a path for guiding a store visitor from a current location to a location of an item of interest; a mobile device application executed by a mobile electronic device, the mobile device application generating a request for locating the item of interest; and a special-purpose processor that calculates the path from the current location of the store visitor to the location of the item of interest in response to the request received from the mobile device application. The indicators identify the path in response to the special-purpose processor calculating the path.

15 Claims, 6 Drawing Sheets

(56) References Cited

U.S. PATENT DOCUMENTS

| | | |
|---|---|---|
| 2010/0052866 A1 | 3/2010 | Elferich et al. |
| 2011/0203147 A1 | 8/2011 | Van Herpen et al. |
| 2011/0267179 A1 | 11/2011 | Patterson |
| 2012/0282024 A1* | 11/2012 | Hua ........................ E01F 9/529 404/15 |
| 2013/0166193 A1 | 6/2013 | Goldman et al. |
| 2014/0343846 A1* | 11/2014 | Goldman ............. G05D 1/0272 701/525 |
| 2015/0011164 A1 | 1/2015 | Chen et al. |
| 2015/0123770 A1 | 5/2015 | Jones |
| 2016/0035011 A1 | 2/2016 | Tuo et al. |
| 2016/0063609 A1 | 3/2016 | Argue et al. |

OTHER PUBLICATIONS

International Search Report & Written Opinion in International Patent Application No. PCT/US17/55514, dated Jan. 29, 2018; 13 pages.

Invitation to Pay Additional Fees in International Patent Application No. PCT/US17/55514, dated Nov. 27, 2018; 2 pages.

International Prelminary Report on Patentability in PCT/US2017/055514 dated Apr. 25, 2019; 16 pages.

\* cited by examiner

FIG. 5

SYSTEMS AND METHODS FOR DIRECTING A USER TO A LOCATION OF INTEREST

RELATED APPLICATIONS

This application claims priority to U.S. Provisional Patent Application Ser. No. 62/406,578, filed on Oct. 11, 2016 entitled "SYSTEMS AND METHODS FOR DIRECTING A USER TO A LOCATION OF INTEREST," the entirety of which is incorporated by reference herein.

BACKGROUND OF THE INVENTION

Technical Field

The present inventive concepts relate generally to techniques for navigating people to a location of interest, and more specifically, to flooring constructed and arranged to provide a pathway from a current location of a user to a location of interest.

Background

Modern superstores, warehouses, or other large retail establishments typically carry a large amount and variety of merchandise over a large area. A person seeking directions to an item of interest or other location of interest in the large establishment must rely on a store assistant, floor map, and/or signage.

SUMMARY

In one aspect, provided is a system for directing a shopper to an item of interest in a store, comprising: a floor surface at a store configured with indicators constructed and arranged to communicate with each other to identify a path for guiding a store visitor from a current location to a location of an item of interest; a mobile device application executed by a mobile electronic device, the mobile device application generating a request for locating the item of interest; and a special-purpose processor that calculates the path from the location of the store visitor to the location of the item of interest in response to the request received from the mobile device application, wherein the indicators identify the path in response to the special-purpose processor calculating the path.

In some embodiments, the path is a shortest available path.

In some embodiments, the floor surface indicators include visual indicators that illuminate to identify the path.

In some embodiments, the visual indicators output a predetermined color.

In some embodiments, the floor surface indicators include tactile indicators that provide a textured surface along the path.

In some embodiments, the floor surface forms a plurality of paths, each path for a different store visitor.

In some embodiments, each path illuminates a different color.

In some embodiments, a timing mechanism that inactivates the indicators after a predetermined period of time.

In some embodiments, the system further comprises a timing mechanism that inactivates the indicators after a predetermined period of time.

In some embodiments, the timing mechanism is controlled by the mobile device application.

In some embodiments, the special-purpose processor accesses a database that includes a stored map of the store and a record that includes the location of the item of interest to determine the path.

In some embodiments, the special-purpose processor redirects the store visitor to the item of interest along a different available path when a determination is made that the path does not include sufficient indicators for forming the path.

In some embodiments, the floor provides visual information in addition to the identified path.

In some embodiments, the indicator includes a pressure sensor that distinguishes the store visitor from an object.

In another aspect, provided is a floor surface of a store, comprising: a plurality of tiles, each tile including: a plurality of sides, each side including a sensor for detecting a presence of an indicator of a neighboring tile; a memory that stores data regarding the presence of the indicator of the neighboring tile; an indicator that activates in response to a received command that a path has been identified; and a processor that receives the command and instructs the indicator to activate or inactivate, and that detects when the indicator is not functioning, wherein the plurality of tiles communicates with each other to identify the path, and to determine when one or more of the tiles has a defective indicator in which case the path is not formed.

In some embodiments, each tile includes a redundant circuit that permits each tile to communicate with the neighboring tile when the indicator is not functioning.

In another aspect, provided is a system for directing a shopper to an item of interest in a store, comprising a floor surface at a store configured with indicators constructed and arranged to communicate with each other to identify a path for guiding a store visitor from a current location to a store exit; and a special-purpose processor that calculates the path from the current location of the store visitor to the store exit, wherein the indicators identify the path in response to the special-purpose processor calculating the path.

In some embodiments, the floor circuit includes a plurality of tiles, each tile including a redundant circuit that permits the tile to communicate with the neighboring tile when the indicator is not functioning.

In another aspect, provided is a method for directing a shopper to an item of interest in a store, comprising: processing a request for guiding a store visitor to an item of interest; identifying a path from a current location of the store visitor to the item of interest; and activating a plurality of indicators in a floor surface to identify the path.

In some embodiments, the method further comprises redirecting the shopper to the item of interest along a different available path when a determination is made that the path does not include sufficient indicators for forming the path.

In some embodiments, the method further comprises inactivating the indicators after a predetermined period of time.

DETAILED DESCRIPTION OF EMBODIMENTS OF THE INVENTION

Figures 1, 2A, 2B:
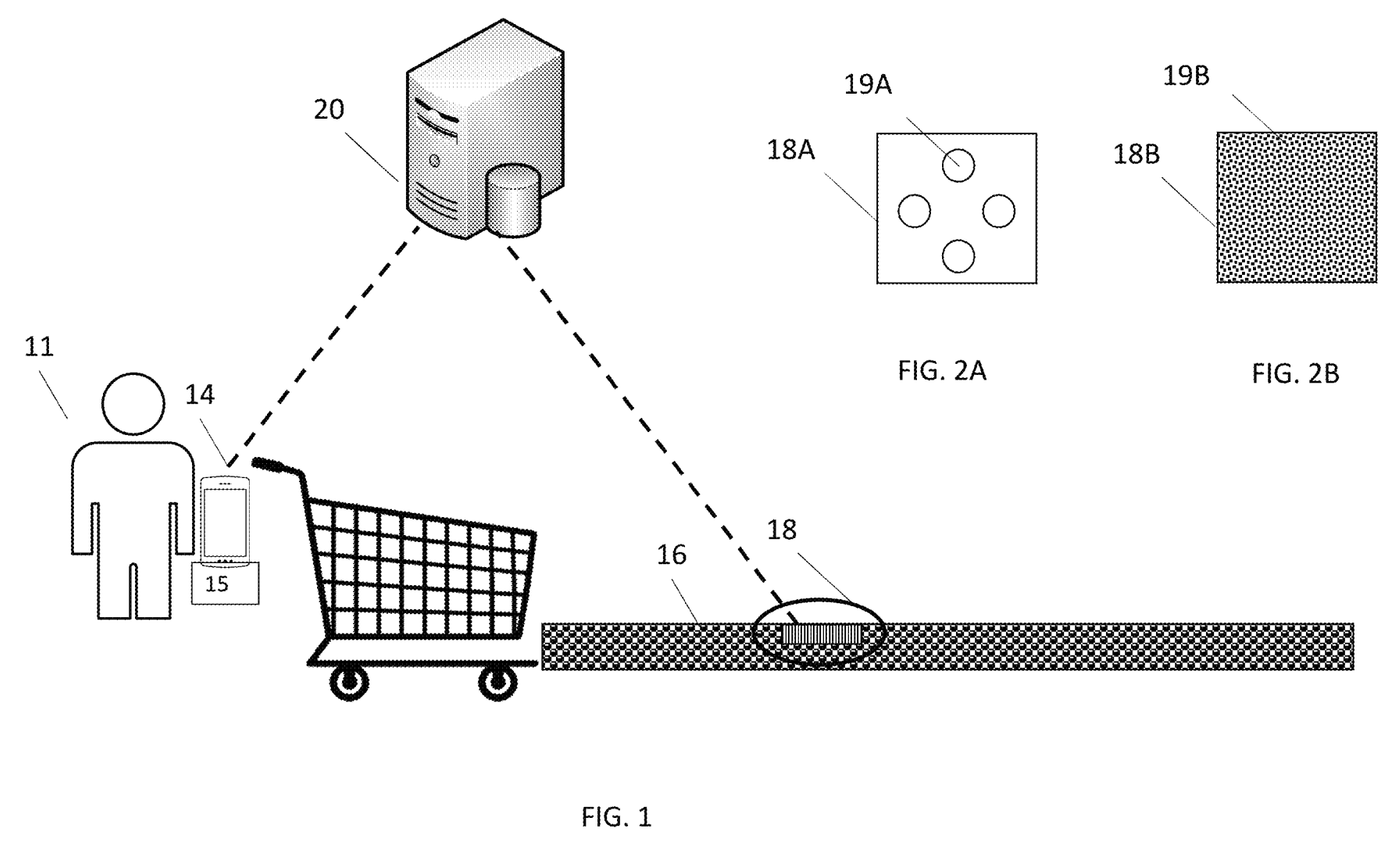
FIG. 1 is an illustration of an environment in which embodiments of the present inventive concepts may be practiced.
FIG. 2A is a top view of a programmable floor tile, in accordance with some embodiments.
FIG. 2B is a top view of a programmable floor tile, in accordance with some embodiments.

FIG. 1 is an illustration of an environment in which embodiments of the present inventive concepts may be practiced.

A system comprising a store server 20, a mobile device application 15 executed on a mobile computing device 14, and a floor surface 16 formed of a plurality of special-purpose, programmable floor tiles 18 provide the environment where store customers can be guided to locations of interest. Embodiments of the present inventive concepts are not limited to a retail store and shopping environment as shown and described. For example, the system illustrated and described with respect to FIG. 1 may equally apply at another facility such as a hospital, shopping mall, or office building, or an outdoor location such as a college campus.

As shown in FIGS. 2A and 2B, the tiles 18 of the floor surface 16 are each configured with a plurality of indicators 19A, 19B (generally, 19) that communicate with each other to form a path, for example, visual and/or textual, for guiding a store visitor 11 from a current location to a location of an item of interest. As shown in FIG. 2A, the indicators 19A of tile 18A may be light emitting diodes (LEDs) or other devices that output visible light. As shown in FIG. 2B, the indicators 19B of tile 18B may include tactile directional elements that provide texture, e.g., protrusions or "bumps," that automatically and selectively protrude from the tile 18 in response to a receipt by the tile 18B of a signal from a store server controller, for guiding the user 11 to a desired destination. Such bumps may be formed by a tile 18 having different materials that are less rigid than the body of the tile, and that has elastic or other deformable characteristics permitting the bumps to expand and contract relative to the body of the tile 18, for example, in response to a signal received by the bumps. Tactile directional elements for example may be formed in the tile 18B and be in the form of arrows or other directional indicators which are raised out or protrude from the tile 18B. In some embodiments, a tile 18 may include both visual 19A and tactile 19B indicators. In some embodiments, the floor tile may include an electronic display for displaying visual information such as advertisements, videos, product information, and so on in addition to an identified path. The electronic display may be visible from a user at or near the tile for viewing the contents electronically displayed.

The mobile device application 15 may be executed at a smartphone, laptop computer, electronic notebook, or other personal mobile computing device 14. The mobile device application 15 when executed at the mobile computing device 14 generates a request for locating an item of interest or otherwise seek guidance for directions to a location where an item of interest is located. The mobile device 14 includes a transmitter for electronically outputting the request as part of an electronic communication, which may be received by a WiFi device or other network computer (not shown) and subsequently received by the store computer 20 also in communication with the network computer. A user 11 may select a button, icon, or other display element as part of the application 15 displayed at a mobile device screen. In response, the floor tiles 18 communicate with each other to form a pathway in a direction of the location of the item of interest.

In some embodiments, the store computer 20 includes a special-purpose processor that calculates the shortest available path from the current location of the store visitor 11 to the location of the item of interest in response to the request received from the mobile device application, and outputs signals that include instructions to the floor tiles 18 to identify the shortest available path in the form of illuminated lighting and/or texture patterns for use by the store visitor 11. The store computer 20 may include a special-purpose processor that accesses a database that includes a stored map of the store and a record that includes the location of the item of interest to determine the shortest available path. The store computer 20 may communicate with an inventory server or other data repository that stores information on item locations, and determine the location of the item of interest from the stored information at the data repository. For example, the store computer 20 may consider a list of items of interest in a shopping list stored electronically along with locations of those items when determining a route. For example, the first item on a list may include bananas. However, apples are also on the list and are along the same route but at a closer location of the route than the bananas. This information may be factored into a calculation of a shortest available path.

The customer's mobile device 14 may include a global positional service (GPS), WiFi, or other interface that establishes a current location of the mobile device 14, and therefore, the location of the customer 11. The known location of the customer 11 and the item of interest, along with the store map, may be processed to determine some or all available paths from the customer location to the item location. A shortest available path may be determined from the known paths based on distance, time, and/or item location to reach the item of interest from the customer's current location. The shortest available path is preferably determined prior to providing a navigation path for the customer 11 to follow in order to reach the location of the item of interest.

Figure 3:
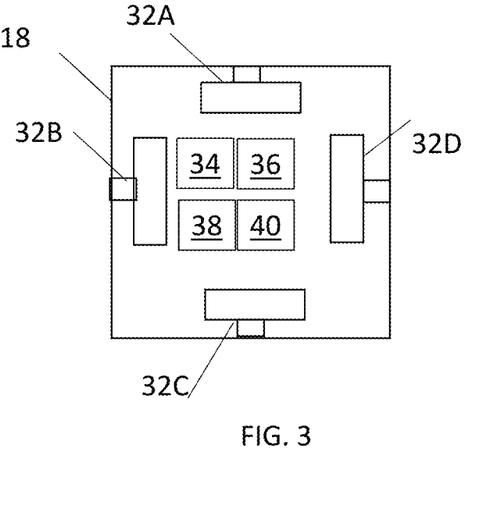
FIG. 3 is a detailed block diagram of a floor tile of FIGS. 1, 2A, and 2B, in accordance with some embodiments.
Figure 4:
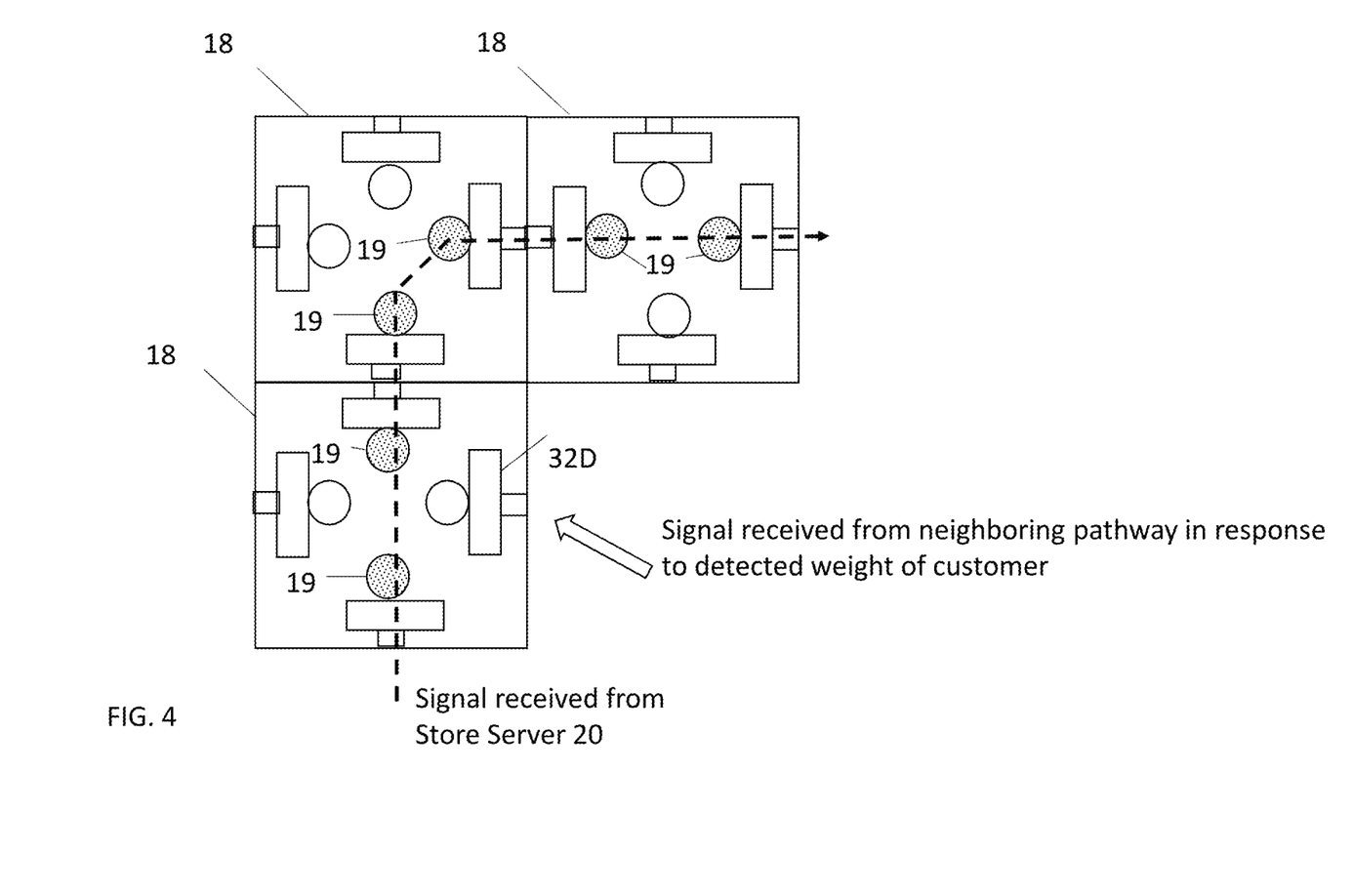
FIG. 4 is a top view of a portion of a store floor including several floor tiles adjacent each other and providing a path from a shopper and a store item of interest, in accordance with some embodiments.

As shown in FIG. 3, each floor tile 18 may have a sensor 32A-32D (generally, 32), or circuit, or other element at each of the four sides of the tile 18 for detecting and communicating with one or more neighboring tiles 18. The sensors 32 are provided to detect a presence of a neighboring tile, or more specifically, determine whether a neighboring tile is operational and capable of activating its indicators 19. The sensor 32 may include pressure sensors and may work in concert with GPS, WiFi, Bluetooth™, NFC, and/or other network devices in the tiles 18 to establish a current location of a store visitor such as a shopper or store associate, which in turn can establish which tiles 18, or more specifically, which indicators 19, are to be activated for establishing a path based on the visitor's current location and the destination of interest.

In embodiments, where the floor tile 18 is of a different shape than a square or rectangle or other 4-sided configuration, a sensor 32 may be at each side, for example, at each of six sides of a hexagon-shaped floor tile 18. In some embodiments, a sensor 32 includes an electrical connector that couples with an electrical connector of a neighboring tile when coupled to the neighboring tile so that an electric circuit is formed between the two tiles 18, and so that the LEDs 19A, tactile elements 19B, or other indicators 19 are activated. The electrical connectors may physically abut each other to establish a conductive connection between the two tiles. In other embodiments, the sensors of two neighboring tiles 18 exchange signals wirelessly between each other, e.g., WiFi, Bluetooth™, NFC, and so on. A conductive path formed between the tiles 18 in a path permit one or more different communications for establishing a path to a location of interest, including one or more of pressure sensing, wireless, remote communications with a controller such as the store server 20, user mobile computing device, and so on.

The floor tile 18 may also include a memory 34, a processor 36, and a controller 40. The memory 34 electronically stores data regarding signaling paths, and in particular, data regarding the presence of a functional indicator 19 of a neighboring tile 18. For example, when a sensor 32 of one tile 18 communicates with a sensor 32 of another tile 18, the first tile 18 may determine that the second tile 18 has a non-functioning or inactive indicator 19. This data can be stored at the memory 34 of the first tile, and processed by the processor 36, for example, to establish a connection with a different tile than the tile having the non-functioning or inactive indicator 19. Thus, a memory 34 of a tile 18 may store data regarding indicator statuses, viable signal paths, and so on.

The controller 40 determines which indictors 19 on the tile are to be activated in response to a signal received from the store computer 20 including instructions to form a path in a direction of an identified item of interest. The controller 40 can determine the manner in which LEDs, textile patterns, or other path-defining elements form the portion of the path defined by the tile 18. For example, two store shoppers may share a portion of a path to two different items of interest. Here, the controller 40 may control the LEDs of the tile 18 forming the portion of the common path so that each of the two shoppers can recognize their paths, respectively, for example, alternating between two different colors, each color identifying the path of each shopper.

The controller 40 may also receive via a tile sensor 32 a signal indicating a presence or activity of a person at or near the tile 18. This can trigger the activation of one or more indicators 19 at the tile 18 and/or other tiles along the path. For example, a shopper may step on a part of the flooring near a particular tile 18. The tile 18 can sense this and the tile's controller 40 can illuminate relevant LEDs on the tile 18, while also outputting a signal that is received by a predetermined number of tiles 18 along the path, for example, five tiles in advance of the current position of the shopper, and each tile 18 instructed to also illuminate their relevant LEDs.

A tile 18 may also include a redundant circuit 38 for forming an alternative path when a determination is made. For example, a controller 40 may receive a signal indicating that a particular LED is defective, or that a circuit between multiple tiles 18 along an established path to an item is broken. The controller 40 at a tile 18 can activate the redundant circuit 38 to form a circuit path to an alternative tile 18, or to a different set of LEDs, textile pattern generators, or other indicators 19 of the tile or tiles where the defective elements are identified. The store computer 20 may also receive a notification of the defective or unavailable tile or tiles and recalculate the data to determine an alternative path.

A tile 18 may include a timing mechanism that inactivates the indicators after a predetermined period of time. The timing mechanism can be overridden by the server 20 in situations where two paths cross, for example, where a case where two or more shoppers are each provided with a path, and the paths intersect at a same tile 18.

Figure 6:
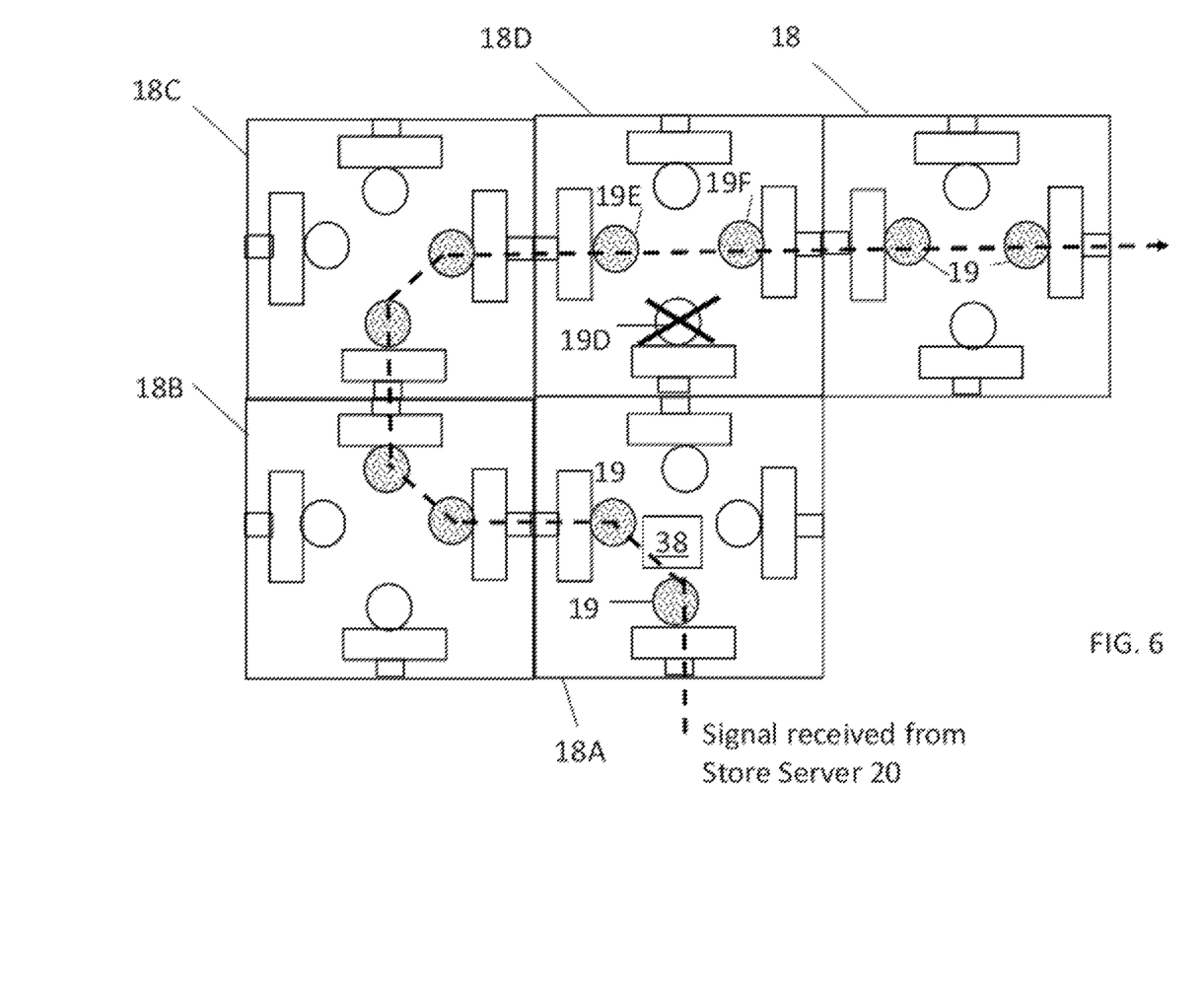
FIG. 6 is a top view of a portion of a store floor including several floor tiles adjacent each other and providing a path from a shopper and a store item of interest where a tile has a defective LED, in accordance with some embodiments.

As shown in FIG. 6, a tile 18D has an indicator 19D that is intended to be part of a shortest available path established by the store computer 20, but is broken, disabled, or otherwise unavailable. The controller 40 of tile 18D may send a signal to neighboring tile 18A. Tile 18A includes a processor 36 that receives the signal and updates the memory 34 to note that indicator 19D of tile 18D is unavailable. The redundant circuit 38 of tile 18A may reroute the illumination path to include indicators 19 in other tiles 18B and 18C and available indicators 19E, 19F at tile 18D.

In other embodiments, the store computer 20 may receive data from other sources that warrants the recalculation of a path. For example, the floor tiles 18 along the shortest path may not be defective, but the store computer 20 may receive information that a particular aisle is not available to thru-traffic, for example, because the aisle is being washed. The store computer 20 may establish a different path so that the tiles 18 along the aisle being cleaned are not activated for forming the path.

Figure 5:
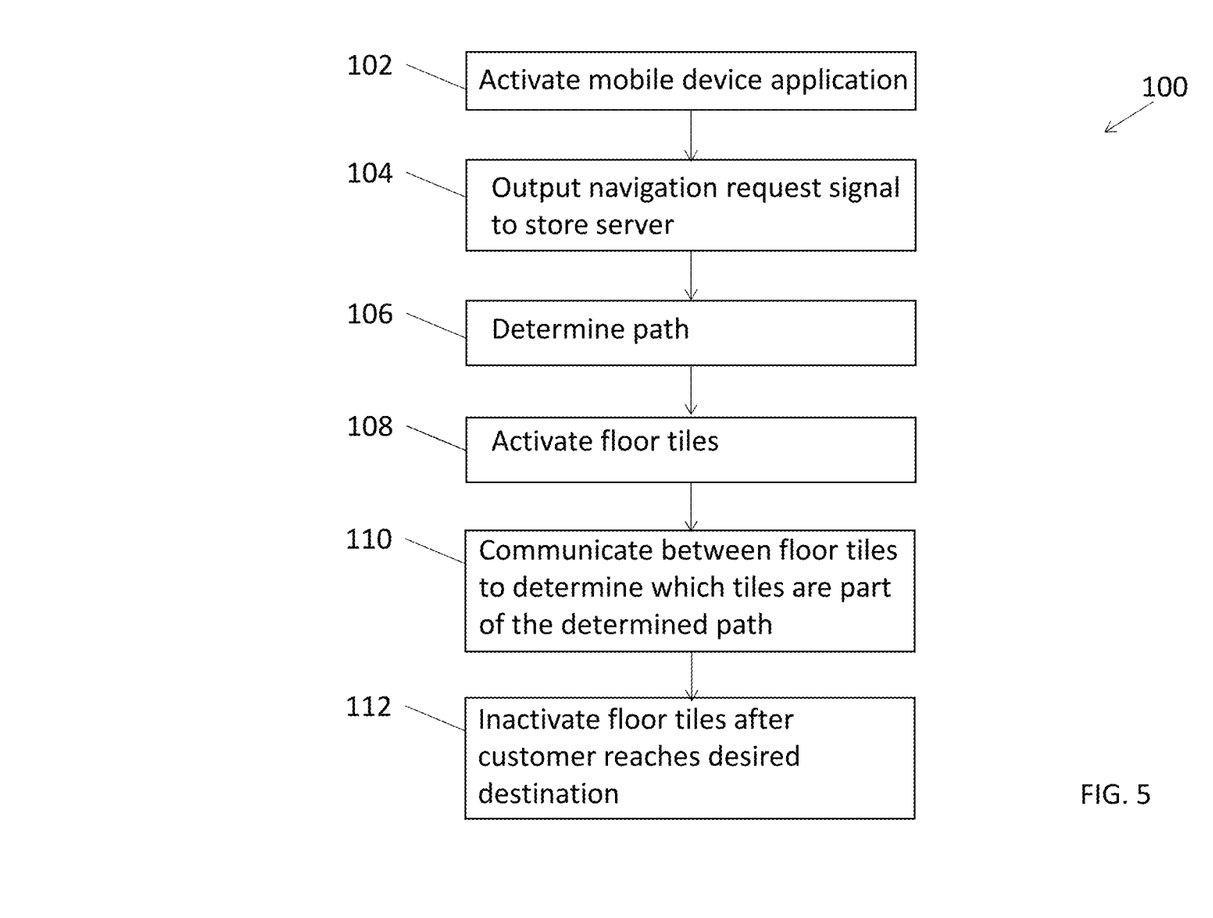
FIG. 5 is a flow diagram of a method for directing a shopper to a location of interest in a store, in accordance with some embodiments.

FIG. 5 is a flow diagram of a method 100 for directing a shopper to a location of interest in a store, in accordance with some embodiments. In describing the method 100, reference is made to elements of FIGS. 1-4. Some or all of the method 100 may be performed at the store server 20, mobile device application 15, and/or special-purpose, programmable floor tiles 18 described with reference to FIGS. 1-4.

At block 102, a mobile device application 15 is activated. A store customer 11 may execute the application 15 at the customer's mobile device 14 to request guidance on the location of an item of interest at the store.

At block 104, the activated mobile device application 15 generates a navigation request signal that is output from a mobile device transmitter such as a WiFi interface, Bluetooth™ transmitter, or other wireless or wired connector via a communications network to the store server 20. The communications network may include a WiFi network, local area network, Internet, and so on.

At block 106, the store server 20 determines at least one path from the mobile device 14 to the item of interest identified at block 102. In some embodiments, the path is a shortest known or available path. In other embodiments, the path may be different than a shortest known or available path due to a detection of defective tiles that may not produce the necessary indicator, i.e., unable for an LED along the shortest path to illuminate or to produce tactile bumps or the like.

At block 108, the floor tiles 18 included in the determined path are activated. The store computer 20 may include a database that identifies each intelligent floor tile 18, and sends a signal to each floor tile 18 identified from the database as being part of the determined path, and to instruct the identified floor tiles 18 to activate relevant indicators 19, e.g., LEDs, tactile elements, or the like to collectively form the path. Accordingly, at block 110, the floor tiles 18 are determined to be part of the path.

In some embodiments, the floor tiles 18 of a particular path are identified based on a matrix or grid of tiles 18 or other organizational structure of tiles 18. Each tile 18 has a unique identification which establishes its location and configuration in the structure of tiles 18. When a tile 18 is added to the structure, a communication is established between the tile 18 and its neighboring tiles, for example, via sensors 32, contact connectors, network devices, and so on. The presence of the tile is therefore made known to the neighboring tiles, and information about the newly added tile 18 is stored in a memory 34 of the neighboring tiles 18. Similarly, information about the presence about the neighboring tiles is stored in the memory 34 of the newly added tile 18. For example, a tile 18 added to a corner of an array of tiles may establish, or learn, about the presence of two neighboring tiles, for example, abutting sensors 32A and 32D, respectively, in the tile 18 shown in FIG. 3.

At block 112, the floor tiles 18 are inactivated after the shopper is determined to reach the desired destination. For example, the last tile 18 in the determined path may sense the presence of the customer, whereby the end of the path is established and all tiles in the path are inactivated.

FIG. 6 is a top view of several floor tiles 18 adjacent each other and providing a shortest available path from a shopper and a store item of interest where a tile has a defective LED, in accordance with some embodiments.

Figure 7:
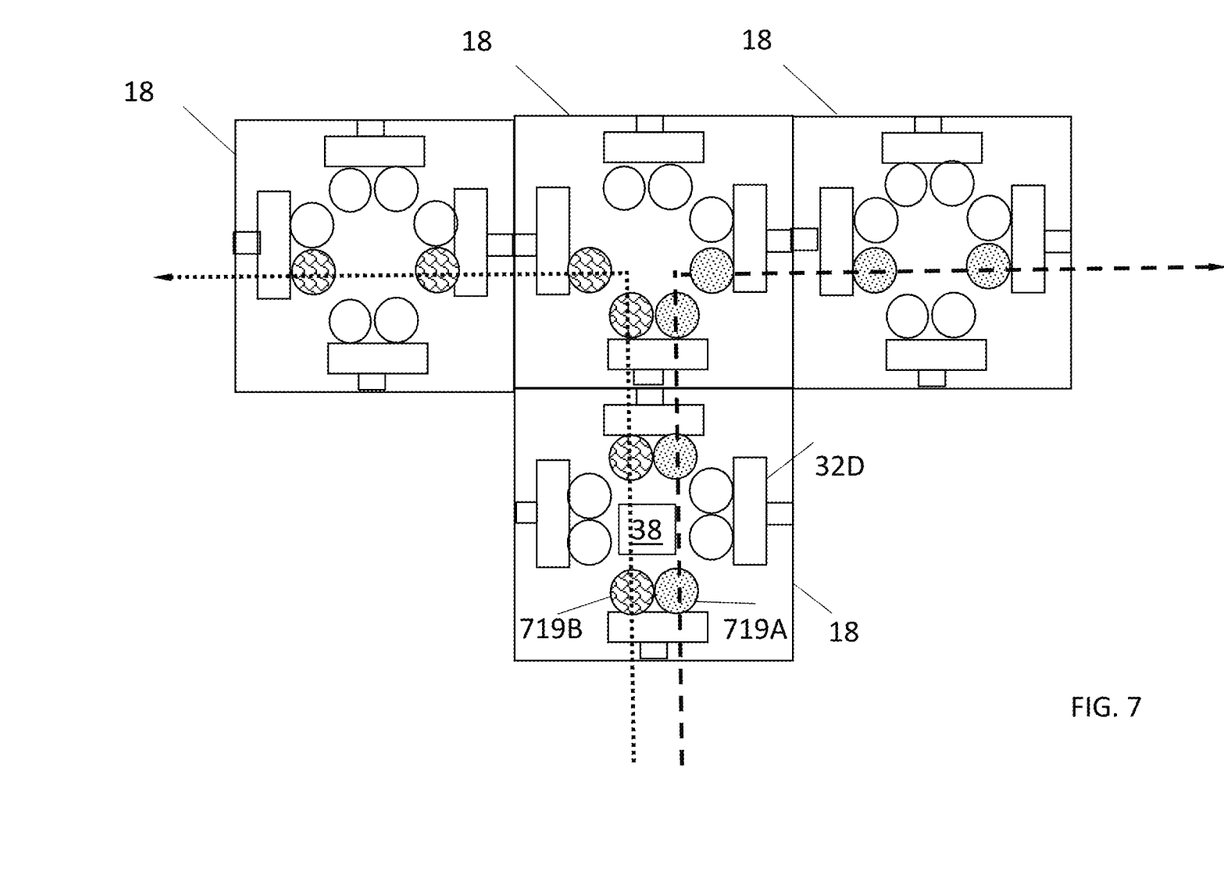
FIG. 7 is a top view of a portion of a store floor including several floor tiles adjacent each other and providing two paths, one for each of two different shoppers, in accordance with some embodiments.

FIG. 7 is a top view of a portion of a store floor including several floor tiles adjacent each other and providing two paths, one for each of two different shoppers, in accordance with some embodiments. In some embodiments, the floor surface forms a plurality of paths, each path for a different store visitor. wherein each path illuminates a different color, tactile pattern, or other unique identifier. Each tile 18 may include multiple indicators, one for each identified customer. Alternatively, a common indicator 19 may be used to identify different customers, for example, alternating between different colors emitted for each customer sharing the tile 18 as part of a common path.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A system for directing a shopper to an item of interest in a store, comprising:
a floor surface at a store configured with indicators constructed and arranged to communicate with each other to identify a path for guiding a store visitor from a current location to a location of an item of interest, wherein the floor surface indicators include both color indicators that illuminate to identify the path and tactile indicators that automatically and selectively protrude from the floor surface along the path in response to a receipt of a signal from a controller of a store computer;
a mobile device application executed by a mobile electronic device, the mobile device application generating a request for locating the item of interest; and
a special-purpose processor of the store computer that calculates the path from the current location of the store visitor to the location of the item of interest in response to the request received from the mobile device application, wherein the indicators identify the path in response to the special-purpose processor calculating the path and communicating with the controller to illuminate the color indicators and to output the signal to the tactile indicators to automatically and selectively protrude from the floor surface.

2. The system of claim 1, wherein the path is a shortest available path.

3. The system of claim 1, wherein the floor surface forms a plurality of paths, each path for a different store visitor.

4. The system of claim 3, wherein each path illuminates a different color.

5. The system of claim 1, further comprising a timing mechanism that inactivates the indicators after a predetermined period of time.

6. The system of claim 5, wherein the timing mechanism is controlled by the mobile device application.

7. The system of claim 1, wherein the special-purpose processor accesses a database that includes a stored map of the store and a record that includes the location of the item of interest to determine the path.

8. The system of claim 1, wherein the special-purpose processor redirects the store visitor to the item of interest along a different available path when a determination is made that the path does not include sufficient indicators for forming the path.

9. The system of claim 1, wherein the floor provides visual information in addition to the identified path.

10. The system of claim 1, wherein the indicator includes a pressure sensor that distinguishes the store visitor from an object.

11. The system of claim 1, wherein a region of the floor surface at the location of the item of interest inactivates the color and tactile indicators along the path when a force is sensed at the location of the item of interest.

12. A method for directing a shopper to an item of interest in a store, comprising:
processing a request for guiding a store visitor to an item of interest;
identifying a path from a current location of the store visitor to the item of interest; and
activating a plurality of indicators in a floor surface to identify the path, wherein the indicators include both color indicators that illuminate the path and tactile indicators that automatically and selectively protrude from the floor surface along the path.

13. The method of claim 12, further comprising redirecting the shopper to the item of interest along a different available path when a determination is made that the path does not include sufficient indicators for forming the path.

14. The method of claim 12, further comprising inactivating the indicators after a predetermined period of time.

15. The method of claim 12, wherein an end of the path at the item of interest inactivates the color and tactile indicators along the path when a force is sensed at the item of interest.

* * * * *